United States Patent [19]

Preeschl

[11] 4,109,404

[45] Aug. 29, 1978

[54] BITE SIGNALLING FISHING BOBBER WITH FLEXIBLE HOUSING

[76] Inventor: Raymond C. Preeschl, 425 E. 25th St., Hialeah, Fla. 33013

[21] Appl. No.: 706,498

[22] Filed: Jul. 19, 1976

[51] Int. Cl.² ............. A01K 85/01; A01K 93/00; A01K 97/12

[52] U.S. Cl. ............................................. 43/17

[58] Field of Search ............ 43/17.5, 17, 43.14, 43/44.91, 44.95; 9/8.3 E

[56] References Cited

U.S. PATENT DOCUMENTS

| | | | |
|---|---|---|---|
| 2,193,404 | 3/1940 | Goertzen | 43/17 |
| 2,320,948 | 6/1943 | Marthey | 9/8.3 E |
| 2,721,342 | 10/1955 | Pickren | 9/8.3 E |
| 2,754,616 | 7/1956 | Law | 43/44.91 |
| 2,777,238 | 1/1957 | Taylor et al. | 43/17 |
| 3,656,251 | 4/1972 | Snider et al. | 43/17 |

Primary Examiner—Ronald E. Suter
Attorney, Agent, or Firm—Ernest H. Schmidt

[57] ABSTRACT

A fishing bobber or float has an inflated, resilient, spherical housing with a diametrically-extending passageway for threading through a fishing line. Fishing line engaging stoppers are provided for adjustably securing the float along the line. An electrically energized signal device within the housing is activated upon compressional distortion of the housing by an incremental pulling stress exerted upon the line and tackled beneath the float while in use by a fish strike or bite. Inertia damping mechanism is provided within the housing to prevent spurious activation of the signal device upon the occurance of water surface disturbance of the floating bobber. A counteracting spring is also provided for adjusting the threshold of actuation of the signal device to a value just above that imposed upon the tackle by the weight of the bait being used, whether dead or alive.

9 Claims, 6 Drawing Figures

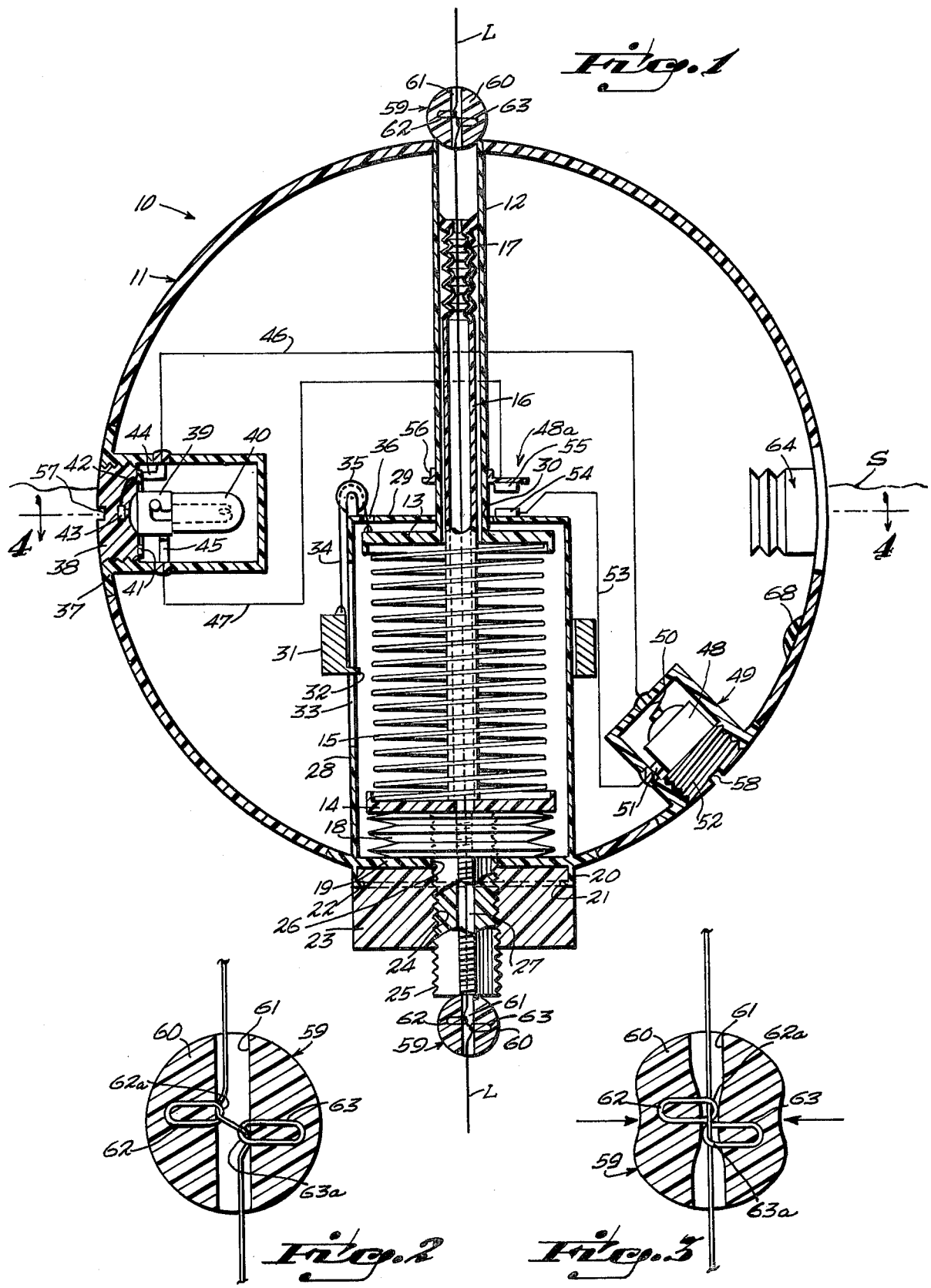

BITE SIGNALLING FISHING BOBBER WITH FLEXIBLE HOUSING

This invention relates to sports fishing, and is directed particularly to a novel and improved fishing float or bobber that will signal a fish bite or strike by automatically switching on a light within the bobber for night fishing and/or energizing a buzzer for day and nighttime fishing.

Various fishing floats or bobbers having illuminated or other means for signalling to the fisherman that he has a bite or strike on his line have heretofore been devised. Such signalling floats or bobbers, however, have been found to be deficient in various respects, principally in that because they were readily actuated for signalling by extraneous influences, such as surface waves, for example, or the tugging action on the fishing line of live bait, they were not reliable. It is the principal object of this invention to provide a fishing float or bobber that obviates the deficiencies of signalling bobbers or floats heretofore devised by the provision of novel means for neutralizing the effects of wave motion and the tugging of live bait, thereby providing for the signalling only of actual fish bites or strikes.

It is another object of the invention to provide a signalling fish bobber of the character described which is entirely self-contained, and which can readily be used as a source of illumination for baiting a hook in the dark, for example, or for use as a flashlight in an emergency.

It is another object of the invention to provide an indicating fish bobber of the above nature which includes a dial-reading weighing scale which can be used by a fisherman for weighing his catch.

Yet another object of the invention is to provide a bite or strike signalling fishing float or bobber of the above nature that is spherical in shape and provided with a diametrically-extending opening for threading onto the fishing line upon assembly of the float thereto, and which includes means for adjustably securing the float along the line.

It is still another object of the invention to provide a signalling fishing float or bobber of the above nature having a resilient housing the upper end of which, in its floating condition, will be subjected to downward forces imposed upon the line by the weight of the bait, whether dead or alive, and the added downward forces occasioned by fish strikes or bites, and including pressure-controlled mechanism within the sperical housing of the float sensitive to differential pressures occasioned by such influences and the influences of wave motion in the vicinity of the float so as to differentiate between such strikes and bites and such extraneous influences as to energize or actuate the signalling means only when subjected to the incremental forces effected by the fish strikes or bites.

Still another object of the invention is to provide a signalling fish bobber or float of the above nature including adjustment mechanism for setting the internal air pressure of the float at a pre-determined value depending upon the weight of the bait being used and whether or not live bait it used so as to eliminate the pressure-increasing effects of such forces on the float mechanism, thereby rendering the device sensitive only to the added or differential influence of pressure occasioned by an actual fish bite or strike.

Yet another object of the invention is to provide fish bite or a strike signalling fishing float or bobber of the character described including mechanism discounting the effects of wave motion upon the bobber and thereby obviating spurious actuation of the signalling device.

Still another object of the invention is to provide a signalling float or bobber of the above nature which will be simple in construction, attractive in appearance, dependable in operation and durable in use.

Other objects, features and advantages of the invention will be apparent from the following description when read with reference to the accompanying drawings. In the drawings, wherein like reference numerals denote corresponding parts throughout the several views:

FIG. 1 is a diametrically-extending, vertical cross-sectional view of a preferred form of signalling bobber embodying the invention, shown assembled to a fishing line and in its floating position of use;

FIG. 2 is a vertical cross-sectional view, on an enlarged scale, of one of the line gripping ball stoppers, shown separately and in the condition of line attachment;

FIG. 3 is a vertical cross-sectional view of the line gripping ball stopper, similar to that of FIG. 2 but illustrated in distorted condition as effected by squeezing between the thumb and the forefinger for loosening the internal line attachment mechanism;

Figure 4:
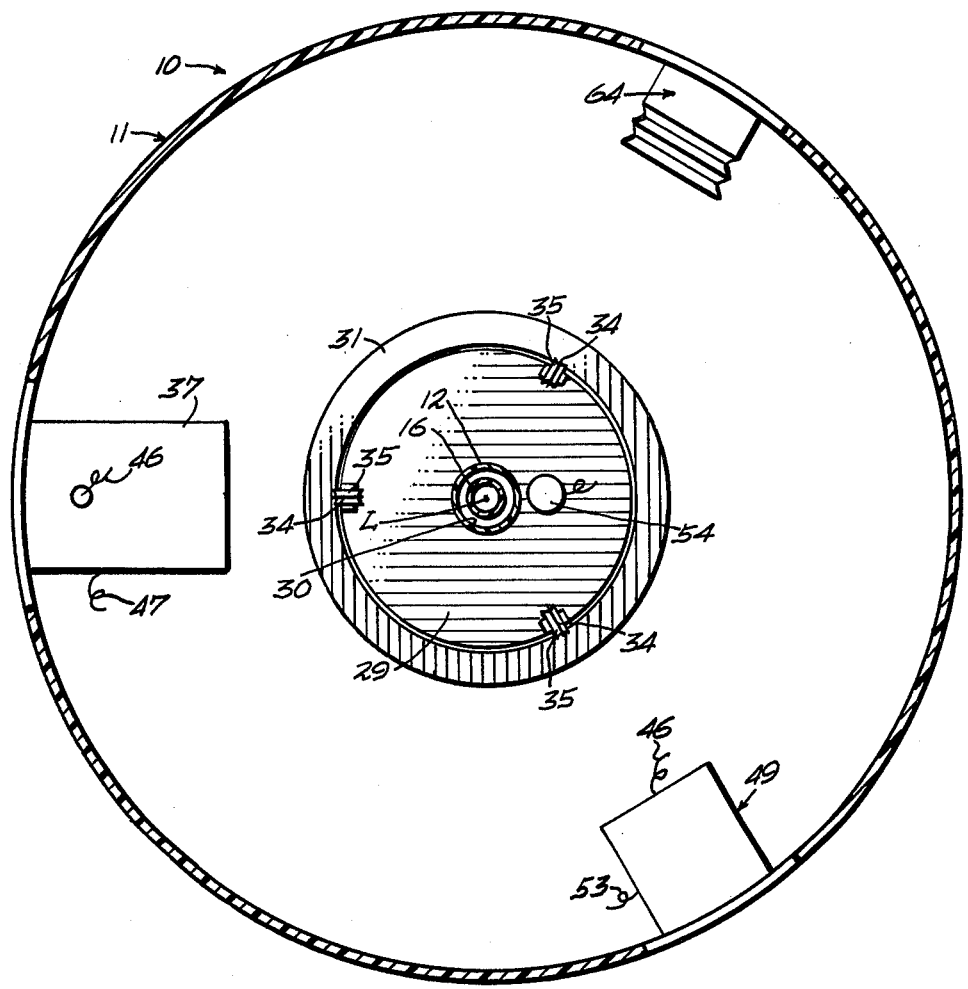
FIG. 4 is a horizontal cross-sectional view of the indicating bobber, taken along the horizontal plane indicated at 4—4 of FIG. 1 in the directionof the arrows.

Referring now in detail to the drawings, reference numeral 10 designates, generally, a preferred form of bite or strike signalling bobber embodying the invention, the same being illustrated in FIG. 1 as assembled to a fishing line L (partially illustrated) and floating upon the surface S of a body of water as in fishing. The bobber 10 comprises a substantially spherical inflatable housing 11 molded or otherwise formed of flexible material such as vinyl plastic or the like. Means is provided for threading through a diametrically-extending opening in the bobber 10 for attachment of the fishing line L in the manner hereinbelow more particularly described. To this end, there is molded in diametrically-extending relation within the housing 11, a rigid tube 12 which, at its inner end, attaches coaxially about the central opening of an upper spring abutment disc 13. Constrained in coaxial relation between the underside of the upper spring abutment disc 13 and a coaxially-spaced, lower abutment disc 14 is a helical compression spring 15. The lower abutment disc 14 has coaxially fixed thereto, about a central aperture therein, an upstanding guide tube 16 of somewhat smaller external diameter than the internal diameter of rigid tube 12 and which, at its upper end, as illustrated in FIG. 1, extends partially within said rigid tube. The upper end of the inner guide tube 16 is inter-connected with the inside of the rigid tube 12 by means of an expansible, accordion-like bellows member 17. The underside of the lower spring abutment disc 14 has cemented or otherwise secured to it, in coaxial relation, a light-weight bellows 18 the underside of which is similarly secured to a circular bottom end plate 19 the outer periphery of which is joined in water-tight relation with a bottom zone of the spherical housing 11. The circular bottom end plate 19 may be conveniently molded of a tough synthetic plastic material and is integrally formed with an outwardly-extending, peripheral flange 20 the outer end of which terminates in an inwardly-directed annular ring portion 21 captured in an annular groove 22 in a calibrating dial 23 rotatable with respect thereto. The calibrating dial 23 is provided with a centrally drilled and tapped opening 24 threadingly received within which is a square, externally-threaded drive stud 25 the inner end of which abuts the underside of the lower spring abutment disc 14. The circular bottom end plate 19 is provided with a square opening 26 complimental in shape to that of the drive stud 25 to prevent turning of said drive stud upon rotary adjustment of the calibrating dial 23 in the manner hereinbelow more particularly described. The drive stud 25 is also provided with an axial through opening 27 which, together with the through opening upstanding guide of the tube 16 and the opening of the rigid tube 12 to which the upper end of said upstanding guide tube is loosely interconnected through bellows member 17, provides for through passage of the fishing line L upon assembly of the bobber thereto. In this connection it will be noted that the light-weight bellows 18 and the bellows member 17 flexibly interconnecting the rigid tube 12 with the upstanding guide tube 16 prevent water leakage into the interior of the housing 11.

The bottom end plate 19 is also integrally formed with an internal, coaxially-extending cylindrical spring housing member 28, the upper end of which is formed with a circular top portion 29 having a central opening 30 through which the rigid tube 12 freely passes. An annular counter-weight 31, which may be of lead, for example, is disposed in surrounding relation with respect to the cylindrical spring housing member 28, and is constrained to coaxial movement therealong by means of a plurality, three in the example illustrated, of inwardly-projecting lugs 32 receive in respective longitudinally-extending slots 33 in said cylindrical spring housing member. The counter-weight 31 is connected for co-operative movement with respect to the upper spring abutment disc 13 by means of flexible connector chords 34 extending over pulleys 35 journalled in 120 degrees spaced-apart positions upon the circular top portion 29, said top portion being provided with openings 36 for the through passage of said flexible cords.

Electrical lighting means is provided within the housing member 11, energized for signalling a strike or bite upon the associated fishing line L upon operation of a pressure-actuated switching device hereinbelow more particularly described. To this end, there is molded within the housing 11, at approximately horizontal position within the bobber at its floating position of use, a lamp socket housing member 37 molded of a tough, clear plastic material. The cylindrical lamp socket housing member 37 is provided with a screw plug 38 molded within the inside of which is a lamp socket 39 for reception of an electric lamp 40. Molded or otherwise affixed in coaxial relation with respect to the inner surface of the screw plug 38 is an annular contact ring 41 which connects, as by conductor 42, to the bottom electrode 43 of the lamp socket 39. A contact brush 44 extends inwardly of the lamp housing member 37 in fixed position to make brush contact with the contact ring 41 of the screw plug 38 upon its being screw-fitted in place. A second contract brush 45 fixed with respect and extending inwardly of the lamp socket housing member 37 is adapted to make contact with the outer shell of the lamp socket 39 for electrical connection with the cylindrical shell base terminal of the electric lamp 40. Electrical conductors 46 and 47 which connect with the respective first and second contact brushes 44, 45 associated with the electrical lamp 40 are connected in series with a mercury energization cell 48 and a control switch 48a, as is hereinbelow described. The mercury cell 48 is replaceably arranged within a cylindrical housing 49, also molded within the housing 11, preferably at a position near the lower end thereof. The housing 49 has molded therein a central, inwardly-extending brush contact member 50 adapted to connect with the central terminal of the mercury cell 48, and a sidewardly inwardly-extending brush contact member 51 adapted to make contact with the peripheral wall or shell terminal of said mercury cell. A screw plug 52 services to removably retain the mercury cell 48 in proper position within its cylindrical housing 49. The electrical conductor 46 extending from the lamp socket housing member 37 connects with the first brush contact 50 interconnected with one terminal of the mercury cell 48. The remaining electrical conductor 47 extending from the the lamp socket housing member 37 is connected to a movable contact member 55 secured to the underside of a collar 56 which, in turn, is secured with respect to the rigid tube 12. The movable contact 55 will normally be in somewhat spaced relation with respect to a fixed contact member 54 secured upon the circular top portion 29 of the cylindrical spring housing member 28. The fixed conductor 54 is connected through conductor 53 to the remaining energization terminal connection brush contact 51 to complete the energization circuit to the electrical lamp 40. It will thus be noted that when the movable contact 55 moves down into contact with the fixed contact member 54, in the manner hereinbelow more particularly described in connection with the operation of the device, an energization circuit will be completed between the energizing mercury cell 48 and the electric lamp 40, causing the lamp to light and illuminate the interior of the bobber housing 11. Since the housing 11 will be of a clear or lightly colored material, the bobber will glow in a manner that will be clearly visible and attention-drawing, even under daylight conditions. It will be understood of course that such signalling will be especially useful for fishing at night or under twilight visibility conditions.

The screw plugs 38 and 52 for replacing the electric lamp 40 and the mercury cell 48, respectively, will preferably be formed with tapered or pipe threads for air tight fitting, and with outside kerfs 57, 58, respectively, to facilitate removal and replacement with use of a screwdriver.

Means is provided for adjustably positioning the bobber 10 along the fishing line L. To this end, a pair of line gripping ball stoppers 59 are assembled to the fishing line at each end of the bobber 10. As best illustrated in FIGS. 2 and 3, which illustrate the ball gripping stoppers in line-attaching and line-freeing positions, respectively, said stoppers each comprise a spherical body portion 60 molded or otherwise formed of a resilient plastic or synthetic rubber material having a diametrically-extending through opening 61 within the interior walls of which are molded a pair of somewhat axially displaced elongated loop members 62, 63 which, upon manually squeezing together the ball body portions between the thumb and forefinger, as represented in FIG. 3, project loop end portions 62a and 63a, respectively into the interior of the diametrical through opening to permit the passage of the fishing line L therethrough in its passage through said diametrical opening. Upon the subsequent release of the ball stoppers, as illustrated in FIG. 3, the body portions will resume their spherical shape and the loop end portions 62a and 63a will, at the same time, be withdrawn into the body of the ball to such an extent as to clamp linear spaced zones of the fishing line against opposite wall portions of the diametrical opening, whereby the stoppers 59 will be locked in place. In this connection, it is to be noted that the elongated loop members 62, 63 are of metal, and non-bonding with respect to the material within which they are embedded so as to provide for free movement into the diametrical opening when their respective spherical body portions are compressed as described above. It will thus be evident that the bobber 10 can readily be moved to the desired position along the length of the fishing line L simply by repositioning the adjustment stoppers in the manner thus described.

Figure 5:
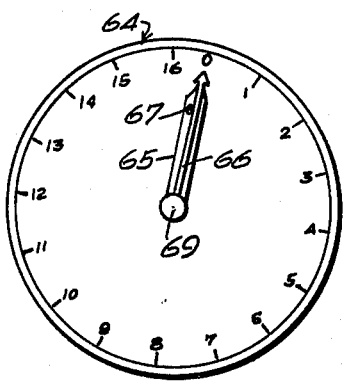
FIG. 5 is an enlarged view of the pneumatic weight indicating scale, shown separately and at zero indicated position.
Figure 6:
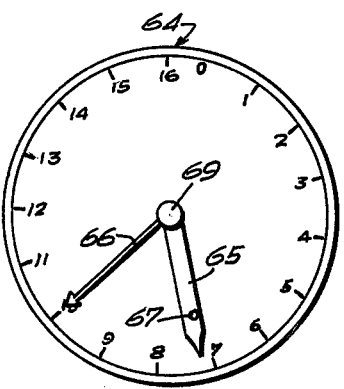
FIG. 6 is a view of the weight indicating scale as in FIG. 5 but showing the actual weight scale indicator and maximum weight scale indicator at typical position of use.

The bobber housing is also fitted with an internally extending, pneumatically-actuated air pressure gauge 64 which translates interior air pressure in pounds per square inch to drawbar weight on its face scale, which is visible at the outside of the device. As illustrated in FIGS. 5 and 6, which show the face or dial of the air pressure gauge 64 in zero reading and typical use conditions, respectively, the dial mechanism comprises a weight pointer 65, which indicates the force of fishing line pull, as hereinbelow more particularly described, and a weight marker 66, frictionally journalled on its central axis of rotation and adapted to be moved ahead of the weight-indicating pointer 65 by means of an abutment pin 67 extending upwardly of an outer end portion of said weight pointer and bearing against an outer end portion of said weight marker. Thus, as illustrated in FIG. 6, it will be seen, by way of example, that in accordance with pressure conditions imposed within the housing 11 of the signalling bobber 10, the weight-indicating pointer 65 has moved from its rest or zero position to an indicating weight of approximately ten pounds maximum, and thereafter backed off in weight to a scale reading of slightly more than seven pounds, which is the actual force being imposed downwardly upon the bobber by the fishing line at that particular instant.

Reference numeral 68 in FIG. 1 designates an internal blister of rubber or rubber-like material through which a hypodermic needle can be inserted for the injection of air to bring the internal pressure of the bobber housing the proper value during manufacture of the device. The pressure will be such with respect to the calibration of the air pressure gauge 64, that when the bobber 10 is securely affixed to its fishing line by means of the gripping ball stoppers 59 as described above, with said gripping ball stoppers so adjusted to insure that the fishing line through the bobber is taut therebetween, the weight scale of the pressure gauge 64 will read zero pounds. In use of the bobber, the fishing line will then be baited, either with dead or live bait, and the float and such baited tackle extending outwardly thereof will be placed in the water, whereupon the normal or zero reading internal pressure of the bobber will increase to the weight of the suspended tackle and bait pulling upon the bobber while said bobber is supported from underneath by the water. Such weight will activate the pressure gauge weight pointer 65 to the actual weight of the suspended tackle and attached bait. If live bait is used, the scale reading will be actuated to maximum pull being exerted upon the tackle by the live bait. As described above, such maximum weight will be registered on the weight indicating pressure gauge 64 by the weight marker 66, which will have been turned, as described above, by the actual weight indicator or weight pointer 65. It will be understood that the weight marker 66 will thus remain at the maximum weight achieved until such time as manually returned to zero by means of an outwardly extending control knob 69. The bobber and the tackle 10 will then be removed from the water and the maximum weight achieved as indicated by the weight marker 66 will be used as the reading to adjust the calibrating dial 23 to a corresponding reading. This adjustment of the dial 23 serves to compress helical compression spring 15 to such an extent as to prevent inward movement of the rigid tube 12 under internal pressure conditions of the housing 11 less than the predetermined maximum pressure effected by the tackle and bait as described above. Thus, after the bobber and its tackle is returned to the water for fishing, downward movement of the rigid tube 12 and its associated movable contact 55 cannot occur until a fish capable of taking the bait strikes, which, at that instant, will overcome the counteracting forces of the spring 15, the weight 31 and the internal air pressure of the spherical housing 11 inhibiting its concomitant distortion along the vertical or fishing line axis to move the moveable contact 55 down into contact with the fixed contact 54 and thereby complete the above-described energizing circuit to the electrical lamp 40 for indicating to the fisherman that there has been a bite or strike on the line.

Means is provided for preventing false indications of the bobber while in use and being subjected to abrupt displacements caused by waves or rough water. To this end, the counter-weight 31, which is connected for co-operative movement with the rigid tube 12 through the flexible connector cords 34 extending over pulleys 35, serves as an inertial damper preventing sudden inward movements of said rigid tube upon the moving of the bobber over crests or troughs of wavelets or the like. The delayed reaaction thus effected by the counter-weight 31 so inhibits rapid pulls upon the fishing line occasioned by such water movement as to prevent false indications of a strike or bite. Actual fish strikes or bites on the other hand will ordinarily be of sufficiently long duration to over-ride the inertial damping effect imposed by the counterweight 31 to give true indications of such bites or strikes. In this connection it is to be noted that the actual weight and size of the counter-weight 31 will be proportioned to the size of the bobber, the types of fishing engaged in, and the type of surface wave disturbance that can be expected in the waters to be fished. It is also to be understood that the various internal actuating and control devices within the lower half of the housing 11, including the lamp socket housing 37, the mercury cell housing 49 and the pressure gauge 64 will be so located as to lend vertical stability to the bobber as it floats in the water.

While I have illustrated and described herein only one form in which my invention can conveniently be embodied in practice, it is to be understood that this embodiment is given by way of example only and not in a limiting sense. For example, although the housing is described herein as being of resilient material so as to expand somewhat under increase in internal pressure, it could, alternatively, be of a comparatively rigid material with a bellows to accommodate excessive increases in internal pressure. The invention, in brief, comprises all the embodiments and modifications coming within the scope and spirit of the following claims.

What I claim as new and desire to secure by Letters Patent is:

1. A bite signalling fishing bobber comprising, in combination, a hollow, air pressure inflated, substantially spherical flexible housing, an electrical signalling device within said housing, an energizing circuit for said signalling device, normally open-circuit switch means in said energizing circuit and within said housing, means for attaching a fishing line to said housing, said fishing line attaching means comprising a substantially diametrically-extending through opening in said housing through which the fishing line can be threaded, and abutment stop means adjustably positioned along the fishing line in substantially abutting relation with diametrically opposed end portions of said housing, said line attaching means being operative to compressingly distort said flexible housing along the axis of said diametrically-extending through housing opening and thereby vary the cross-sectional shape of said housing along said diametrically-extending axis as a function of tensional stress being imposed along the fishing line from below said housing member while said housing is being floatingly supported from underneath by a body of water, a distortion counteracting spring within said housing and constrained along said diametrically-extending axis thereof, and means responsive to said distortion for close-circuiting said switch means so as to energize said electrical signaling device.

2. A bite signalling fishing bobber as defined in claim 1 wherein said abutment stop means comprises a pair of resilient gripping ball stopping members, each of which gripping ball stopper members comprises a substantially cylindrical body member, a diametrically-extending opening therethrough, and wire loop members molded within said gripping ball member and having loop end portions opening into opposite side portions, respectively, of said opening and operative to project inwardly within said through opening for the threading of the line therethrough upon the manual squeezing together of opposite side portions of said gripping ball member whereupon, upon release of said squeezing action, said loop end portions will frictionally clamp linear spaced zones of said fishing line against opposite sidewall portions of said diametrically-extending through opening.

3. A bite signalling fishing bobber as defined in claim 1 including a pneumatically actuated pressure gage mounted in said spherical housing and having an air pressure sensitive element within said housing to be actuated by air pressure within said housing and a calibrated dial visable from the outside of said housing and indicating weight as a function of internal pressure as imposed upon the housing by the distortion thereof created by the fishing line tension.

4. A bite signalling fishing bobber as defined in claim 3 wherein said diametrically-extending through opening in said housing comprises a rigid tube fixed at one end with respect to one end of said housing and extending inwardly thereof, an upper spring abutment disc secured at the inner end of said rigid tube and having a central opening in communication with the through opening of said rigid tube, a lower abutment disc in coaxially-spaced relation with respect to said upper spring abutment disc, said counteracting spring comprising a helical compression spring constrained between said upper and lower abutment discs, means for adjustably positioning said lower abutment disc in coaxial relation with respect to the other end of said housing and said upper spring abutment disc for varying the reactive force exerted between said ends of said housing by helical compression spring, a guide tube fixed with respect to and extending axially inwardly of said lower abutment disc in communcation with a central opening in said lower abutment disc, the external diameter of said guide tube being somewhat less that the interior diameter of said rigid tube, said guide tube extending coaxially partially inwardly of said rigid tube, a bellows member communicating between the inner end of said guide tube and an interior peripheral wall portion of said rigid tube to permit limited relative axial movement between said rigid tube and said guide tube, and a second bellows member between the outside of said lower abutment disc and the inside of said housing to provide for water-tight integrity between said rigid and guide tube and the interior of said housing.

5. A bite signalling fishing bobber as defined in claim 4 wherein said lower abutment disc positioning means comprises a calibrating dial rotatively supported at the other end of said housing, a drive stud threadingly received within said calibrating dial member in coaxial alignment with and abutting said lower abutment, disc, said drive stud having an axial through opening communicating with the through openings of said rigid and said guide tubes for the through passage of the fishing line.

6. A bite signalling fishing bobber as defined in claim 5 including a subtantially cylindrical spring housing member secured within the other end of said housing in surrounding relation with respect to said upper and lower abutment discs and said helical compression spring, said cylindrical housing member having a circular top portion, said circular top portion having a circular opening for the free passage of said rigid tube, said normally open switch means comprising a first electrical switch contact fixed with respect to said cylindrical spring housing member and a second electrical contact fixed with respect to said rigid tube and normally disposed in spaced relation with respect to said first electrical switch contact, said second electrical contact being adapted to be moved into electrical contact with respect to said first electrical contact upon the inward movement of said rigid tube occasioned by the relative stress imposed by the fishing line extending outwardly of the other end of said housing and said housing.

7. A bite signalling fishing bobber as defined in claim 6 including inertial damping means co-operative with said rigid tube to minimize the possibility of energization of said signalling means by the spurious imposition of short interval stresses imposed by the fishing line as occasioned by rough water.

8. A bite signalling fishing bobber as defined in claim 7 wherein said inertial damping means comprises a cylindrical counter-weight surrounding said cylindrical spring housing member, means constraining said counter-weight to limited coaxial movement with respect to said housing member, and means interconnecting said counter-weight with respect to said upper spring abutment disc for co-operative relative movement.

9. A bite signalling fishing bobber as defined in claim 5 wherein said pressure gauge comprises a weight indicating pointer and a weight marker, said weight pointer being operative to indicate absolute weight applied as a tensional stress imposed by the fishing line and its associated tackle, said pressure gauge further comprising a weight marker coaxially journalled with respect to said weight pointer, and means controlled by movement of said weight pointer to rotate said weight marker to the maximum weight indication of said weight so as to indicate maximum weight being imposed by the tackle while in the water, whereby said calibrating dial can be rotatively manually adjusted to a corresponding value operative to adjust said helical compression spring for neutralizing the tensional force of the immersed tackle, including either live or dead bait, so that close-circuiting of said electrical switch means will be effected only upon the imposition on the immersed fishing line tackle of incremental forces as occasioned by fish bites or strikes.

* * * * *